UNITED STATES PATENT OFFICE.

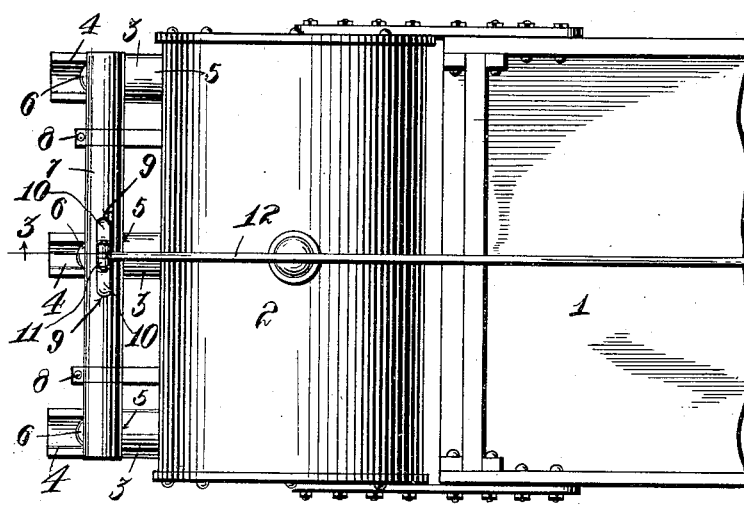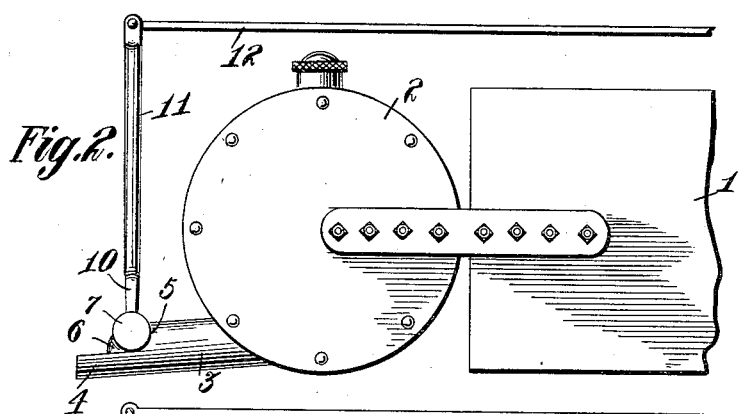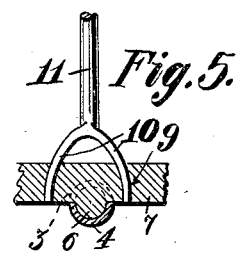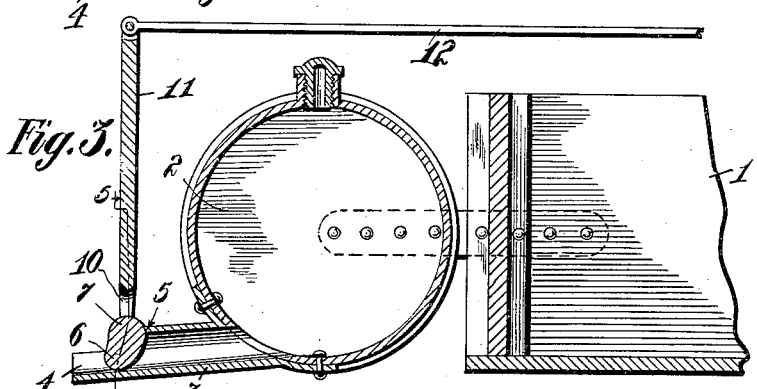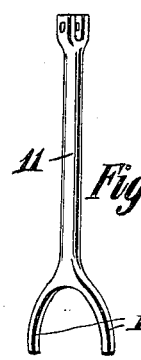

CHRISTOPHER D. BLEVINS, OF RICHMOND, KENTUCKY, ASSIGNOR OF ONE-HALF TO C. B. THARP, OF RICHMOND, KENTUCKY.

DISTRIBUTING-TANK.

1,055,602.  Specification of Letters Patent.  Patented Mar. 11, 1913.

Application filed May 28, 1912. Serial No. 700,235.

*To all whom it may concern:*

Be it known that I, CHRISTOPHER D. BLEVINS, a citizen of the United States, residing at Richmond, in the county of Madison, State of Kentucky, have invented certain new and useful Improvements in Distributing-Tanks; and I do hereby declare the following to be a full, clear, and exact description of the invention, such as will enable others skilled in the art to which it appertains to make and use the same.

This invention is directed to improvements in distributing tanks adapted to be used in spraying young plants, and has for its object to produce a device of this character which may be conveniently attached to the rear of a wagon or the like, so that the same may be moved between the rows of the growing plants.

A further object of the invention is to so construct a device of this character that the flow of liquid to the plants may be readily regulated or cut off entirely.

With these and other objects in view, this invention resides in the novel features of construction, formations, combinations and arrangements of parts to be hereinafter more fully described, claimed and illustrated in the accompanying drawing, in which:—

Figure 1 is a fragmentary top plan view of the wagon showing the device in place thereon. Fig. 2 is an end view of the device. Fig. 3 is a sectional view on line 3—3 of Fig. 1. Fig. 4 is a perspective view of the valve rod. Fig. 5 is a sectional view on line 5—5 of Fig. 3. Fig. 6 is a detail perspective view of the operating lever.

Referring to the drawing, the numeral 1 designates a portion of a wagon body, upon the rear of which is mounted the tank 2, said tank being preferably circular in cross section, and formed from metal.

Having communication with the tank 2 is a plurality of tubes 3, said tubes terminating in troughs 4. It will be of course understood that the number of tubes and troughs may be varied, but in the present instance three of the same are shown, which are deemed sufficient for ordinary uses.

By forming the tubes and troughs integral, the outlets from the tubes form valve seats 5, the flow of liquid from the tank 2 through the tubes 3 and troughs 4 being regulated or cut off by valve plugs 6, said valve plugs being carried by the valve rod 7 which is pivotally supported by brackets 8, said brackets being secured to the tank in any suitable manner.

The valve rod 7 is provided at its center with a pair of spaced perforations 9, in which fit the resilient prongs 10 formed upon the lower end of the lever 11. Thus it will be seen that the prongs 10 may be sprung into the perforations 9 and the lever held in its proper position upon the rod 7.

Pivotally connected to the upper end of the lever 11 is a link 12, the other end of which may be secured in any suitable manner within convenient reach of the driver so that upon shifting said link, the valve rod is operated to regulate or cut off the flow of liquid from the tank 2 to the plant, as desired. From this construction it will be seen that upon operation of the lever 11, the valve rod 7 may be rocked, thereby moving the plugs 6 either to fit upon the valve seats 5 or to regulate the flow of liquid from the tank to the troughs 4.

A fertilizer of any description may be mixed with the liquid when placed in the tank, and thus it will be seen that the device not only waters the plant, but promotes the growth of the same by adding the fertilizer.

What is claimed is:—

A device of the class described comprising a tank adapted to be mounted upon a wagon body, a plurality of tubes leading from the tank, said tubes terminating in troughs, the outer ends of said tubes forming valve seats, brackets mounted upon the tank, a valve rod mounted in the brackets and carrying valve plugs, a lever connected to the valve rod, means for shifting the lever to rock the valve rod, whereby the valve plugs are caused to engage or disengage the seats to control the flow of liquid from the tank to the troughs.

In testimony whereof, I affix my signature, in presence of two witnesses.

CHRISTOPHER D. BLEVINS.

Witnesses:
 FRANK DAVIS,
 JOS. B. THOMPSON.

---

Copies of this patent may be obtained for five cents each, by addressing the "Commissioner of Patents, Washington, D. C."